United States Patent
Zhang et al.

(10) Patent No.: US 9,824,428 B2
(45) Date of Patent: Nov. 21, 2017

(54) IMAGE CORRECTION METHOD, IMAGE CORRECTION APPARATUS AND VIDEO SYSTEM

(71) Applicant: BOE TECHNOLOGY GROUP CO., LTD., Beijing (CN)

(72) Inventors: Lijie Zhang, Beijing (CN); Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 112 days.

(21) Appl. No.: 14/891,943

(22) PCT Filed: May 18, 2015

(86) PCT No.: PCT/CN2015/079165
§ 371 (c)(1),
(2) Date: Nov. 17, 2015

(87) PCT Pub. No.: WO2016/119339
PCT Pub. Date: Aug. 4, 2016

(65) Prior Publication Data
US 2016/0358318 A1    Dec. 8, 2016

(30) Foreign Application Priority Data

Jan. 29, 2015  (CN) .......................... 2015 1 0045283

(51) Int. Cl.
*G06K 9/00* (2006.01)
*G06T 5/00* (2006.01)
(Continued)

(52) U.S. Cl.
CPC ............ *G06T 5/006* (2013.01); *G06K 9/0061* (2013.01); *G06K 9/00248* (2013.01);
(Continued)

(58) Field of Classification Search
CPC .......... H04N 7/144; H04N 7/15; G06F 3/013; G06T 2207/30201; G06T 2207/30041;
(Continued)

(56) References Cited

U.S. PATENT DOCUMENTS 6,677,980 B1 *  1/2004  Jeon ...................... H04N 7/144
                                                      348/14.01
6,806,898 B1 * 10/2004  Toyama .................. G06T 5/006
                                                      348/14.01
(Continued)

FOREIGN PATENT DOCUMENTS

CN       101059836 A       10/2007
CN       102483854          5/2012
(Continued)

OTHER PUBLICATIONS

Office Action from corresponding Chinese Application No. 201510045283.6 (8 pages).
(Continued)

*Primary Examiner* — Li Liu
(74) *Attorney, Agent, or Firm* — Harness, Dickey & Pierce, P.L.C.

(57) ABSTRACT

The present invention provides an image correction method, an image correction apparatus and a video system. The image correction method comprises: obtaining an actual face image; obtaining a target sample image matching with the actual face image; and correcting each eye area of the actual face image according to the target sample image such that orientation of each eye area of the corrected actual face image coincides with orientation of a corresponding eye area of the target sample image. The present invention may enable pupil portions of eye areas in a received face image to look toward a camera, thereby realizing an equal communication and improving sensory experience.

19 Claims, 2 Drawing Sheets

(51) Int. Cl.
  *G06K 9/62* (2006.01)
  *H04N 7/14* (2006.01)
  *H04N 7/15* (2006.01)
  *G06K 9/03* (2006.01)

(52) U.S. Cl.
  CPC ..... *G06K 9/00281* (2013.01); *G06K 9/00288* (2013.01); *G06K 9/036* (2013.01); *G06K 9/6202* (2013.01); *G06K 9/6277* (2013.01); *H04N 7/144* (2013.01); *H04N 7/147* (2013.01); *H04N 7/15* (2013.01); *G06T 2207/30201* (2013.01)

(58) Field of Classification Search
  CPC ....... G06T 7/337; G06T 7/73; G06K 9/00248; G06K 9/0061; G06K 9/00281; G06K 9/6202; G06K 9/00268; G06K 9/00604; G06K 9/46
  See application file for complete search history.

(56) References Cited

U.S. PATENT DOCUMENTS

| | | | | |
|---|---|---|---|---|
| 9,536,133 | B2* | 1/2017 | Kim | G06K 9/00208 |
| 2009/0109400 | A1* | 4/2009 | Yoshinaga | A61B 3/113 |
| | | | | 351/210 |
| 2012/0162356 | A1* | 6/2012 | Van Bree | H04N 7/144 |
| | | | | 348/14.16 |
| 2013/0148883 | A1* | 6/2013 | Lee | G06K 9/3241 |
| | | | | 382/165 |
| 2013/0222644 | A1* | 8/2013 | Son | H04N 5/23219 |
| | | | | 348/239 |
| 2014/0016871 | A1 | 1/2014 | Son et al. | |
| 2014/0055342 | A1* | 2/2014 | Kamimura | G06F 3/013 |
| | | | | 345/156 |
| 2014/0368602 | A1* | 12/2014 | Woodgate | H04N 7/15 |
| | | | | 348/14.07 |
| 2015/0304566 | A1* | 10/2015 | Seo | H04N 5/23222 |
| | | | | 348/222.1 |
| 2015/0309569 | A1* | 10/2015 | Kohlhoff | G06F 3/013 |
| | | | | 345/156 |
| 2016/0066782 | A1* | 3/2016 | Kimura | G06F 3/012 |
| | | | | 351/210 |

FOREIGN PATENT DOCUMENTS

| | | |
|---|---|---|
| CN | 103310186 | 9/2013 |
| CN | 103345619 | 10/2013 |
| CN | 103426195 A | 12/2013 |
| CN | 104574321 | 4/2015 |

OTHER PUBLICATIONS

Written Opinion of the International Searching Authority for corresponding PCT Application PCT/CN2015/079165 (4 pages) and its English translation (5 pages); dated Aug. 21, 2015.

* cited by examiner

IMAGE CORRECTION METHOD, IMAGE CORRECTION APPARATUS AND VIDEO SYSTEM

TECHNICAL FIELD

The present invention relates to the field of display technology, more particularly, to an image correction method, an image correction apparatus and a video system.

BACKGROUND

In nowadays people's life, video transmission technology such as video chat has been widely used. However, during video transmissions, a phenomenon called visual sense inequality is prone to occur in a video communication of two parties due to a difference in viewing positions of cameras. For example, when people are chatting, their eyes are looking at a display screen, but the viewing position of a camera is usually at one side of the display screen, therefore, the other party's image seen by one is not looking at oneself all the time, thus degrading sensory experience.

SUMMARY OF THE INVENTION

An object of the invention is to provide an image correction method, an image correction apparatus and a video system, so that users can visually perform an equal interaction.

For this end, an embodiment of the invention provides an image correction method, comprising:

obtaining an actual face image;

obtaining a target sample image matching with the actual face image; and correcting each eye area of the actual face image according to the target sample image such that orientation of each eye area of the corrected actual face image coincides with orientation of a corresponding eye area of the target sample image.

The step of obtaining a target sample image matching with the actual face image may comprise:

obtaining feature information of the actual face image; and calculating matching degree between the feature information of the actual face image and feature information of each preset sample image in a sample library respectively, and setting, when the matching degree between a preset sample image and the actual face image is larger than a preset value, the preset sample image of which the matching degree with the actual face image is larger than the preset value as the target sample image.

The feature information may comprise any one or more of the following: a center coordinate of each eye area, an aspect ratio of each eye area, a diameter of an iris in each eye area, a ratio of a distance between a center of a left eye area and the nose to a distance between a center of a right eye area and the nose, and a ratio of a distance between a center of a left eye area and the mouth to a distance between a center of a right eye area and the mouth.

Between the step of obtaining a target sample image matching with the actual face image and the step of correcting each eye area of the actual face image according to the target sample image such that orientation of each eye area of the corrected actual face image coincides with orientation of a corresponding eye area of the target sample image, further comprises:

obtaining a center coordinate of a pupil portion of each eye area in the actual face image and a center coordinate of a pupil portion of each eye area in the target sample image; and calculating a distance between the center coordinate of the pupil portion of each eye area in the actual face image and the center coordinate of the pupil portion of the corresponding eye area in the target sample, and performing, when the distance is large than a predefined value, the step of correcting each eye area of the actual face image according to the target sample image such that orientation of each eye area of the corrected actual face image coincides with orientation of the corresponding eye area of the target sample image.

The image correction method may further comprise the following steps performed before the step of obtaining an actual face image:

collecting a plurality of face images as preset sample images, orientation of each eye area of the human being collected in each preset sample image directly facing a camera; and obtaining and storing feature information of each preset sample image to form the sample library.

The image correction method may further comprise the following step performed after the step of obtaining and storing feature information of each preset sample image:

classifying the preset sample images into a plurality of classes according to a predefined rule; and the step of calculating matching degree between the feature information of the actual face image and feature information of each preset sample image in a sample library respectively may comprise:

determining a class of preset sample images corresponding to the actual face image; and calculating matching degree between the feature information of the actual face image and the feature information of each preset sample image within the class of preset sample images corresponding to the actual face image.

The predefined rule may comprise a maximum likelihood classification method.

The image correction method may further comprise the following steps performed before the step of obtaining an actual face image:

establishing a coordinate axis within a visual field range of the camera;

setting a predefined coordinate range within the visual field range, the predefined coordinate range being greater than a distance between center coordinates of two eye areas of the target sample image; and setting, when a center coordinate value of any one of eye areas of the actual face image exceeds the predefined coordinate range, a boundary value of the predefined coordinate range as an actual coordinate value of the center of the eye area in the actual face image which exceeds the predefined coordinate range.

The step of correcting each eye area of the actual face image according to the target sample image such that orientation of each eye area of the corrected actual face image coincides with orientation of a corresponding eye area of the target sample image comprises:

obtaining information of feature points of each eye area in the actual face image and information of target feature points, in the corresponding target sample image, corresponding to the feature points of each eye area in the actual face image;

calculating mapping relationship between the feature points of each eye area in the actual face image and the corresponding target feature points; and calculating a corrected position of each feature point of each eye area in the actual face image according to the mapping relationship.

Accordingly, an embodiment of the invention also provides an image correction apparatus, comprising:

an actual image obtaining module for obtaining an actual face image;

a target sample image obtaining module for obtaining a target sample image matching with the actual face image; and a processing module for correcting each eye area of the actual face image according to the target sample image such that orientation of each eye area of the corrected actual face image coincides with orientation of a corresponding eye area of the target sample image.

The target sample image obtaining module may comprise:

a feature information obtaining unit for obtaining feature information of the actual face image; and a matching degree calculating unit for calculating matching degree between the feature information of the actual face image and feature information of each preset sample image in a sample library respectively, and setting, when the matching degree between a preset sample image and the actual face image is larger than a preset value, the preset sample image of which the matching degree with the actual face image is larger than the preset value as the target sample image.

The feature information comprises any one or more of the following: a center coordinate of each eye area, an aspect ratio of each eye area, a diameter of an iris in each eye area, a ratio of a distance between a center of a left eye area and the nose to a distance between a center of a right eye area and the nose, a ratio of a distance between a center of a left eye area and the mouth to a distance between a center of a right eye area and the mouth.

The image correction apparatus may further comprise:

a coordinate obtaining module for obtaining a center coordinate of a pupil portion of each eye area in the actual face image and a center coordinate of a pupil portion of each eye area in the target sample image; and a decision module for calculating a distance between the center coordinate of the pupil portion of each eye area in the actual face image and the center coordinate of the pupil portion of the corresponding eye area in the target sample image; when the distance is large than a predefined value, the processing module is capable of correcting eye areas of the actual face image according to the target sample image such that orientation of each eye area of the corrected actual face image coincides with orientation of the corresponding eye area of the target sample image.

The feature information obtaining unit also may obtain feature information of preset sample images, and the image correction apparatus may further comprise:

a sample image collecting module for collecting a plurality of face images as preset sample images, orientation of each eye area of the human being collected in each preset sample image directly facing the sample image collecting module; and a storing module for storing feature information of each preset sample image to form the sample library.

The image correction apparatus may further comprise:

a classifying module for classifying the preset sample images into a plurality of classes according to a predefined rule; and the target sample image obtaining module may further comprise:

a categorizing unit for determining a class of preset sample images corresponding to the actual face image; and the matching degree calculating unit is capable of calculating matching degree between the feature information of the actual face image and the feature information of each preset sample image within the class of preset sample images corresponding to the actual face image, respectively.

The predefined rule may comprise a maximum likelihood classification method.

The image correction apparatus may further comprise:

a pre-locating module for establishing a coordinate axis within a visual field range of a camera and setting a predefined coordinate range within the visual field range, the predefined coordinate range being greater than a distance between center coordinates of two eye areas of the target sample image; and setting, when a center coordinate value of any one of eye areas of the actual face image exceeds the predefined coordinate range, a boundary value of the predefined coordinate range as an actual coordinate value of the center of the eye area in the actual face image which exceeds the predefined coordinate range.

The processing module may comprise:

a feature point obtaining unit for obtaining information of feature points of each eye area in the actual face image and target feature points in the corresponding target sample image which match with the feature points of each eye area in the actual face image;

a mapping calculating unit for calculating mapping relationship between the feature points of each eye area in the actual face image and the corresponding target feature points; and a correcting unit for calculating a corrected position of each feature point of each eye area in the actual face image according to the mapping relationship.

Accordingly, an embodiment of the invention also provides a video system comprising the above image correction apparatus provided by the invention.

The image correction method of the present invention can correct each eye area of the actual face image, such that orientation of each eye area of the corrected actual face image is the same as that of the corresponding eye area of the target sample image, both of which directly facing the camera. For the two parties using the video system, an actual face image collected by a camera of a first party is transmitted to a second party which can use the image correction method to obtain the actual face image of the other party, correct and then display the eye areas thereof, such that pupil portions of the corrected eye areas directly face the camera of the first party, that is, for the second party, the first party is viewing toward the second party, thus improving user's visual experience.

BRIEF DESCRIPTION OF THE DRAWINGS

The drawings are provided to facilitate further understanding in the present invention and constitute a part of the specification, and are used to explain the invention along with the following detailed description of the invention, but not a limitation to the invention, in which.

DETAILED DESCRIPTION OF THE INVENTION

Detailed description of the invention will be illustrated in the following in conjunction with accompany drawings. It should be appreciated that the detailed description of the invention herein is only for illustrating and explaining the invention, but not for limiting the invention.

Figure 1:
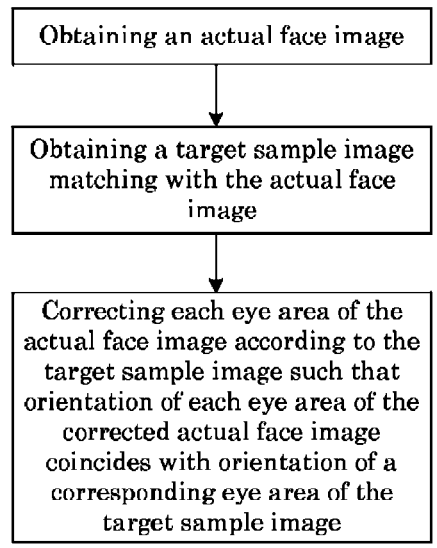
FIG. 1 is a flowchart diagram of an image correction method in an embodiment of the invention.

As one aspect of the invention, there is provided an image correction method, as shown in FIG. 1, comprising:

obtaining an actual face image;

obtaining a target sample image matching with the actual face image; and correcting each eye area of the actual face image according to the target sample image such that orientation of each eye area of the corrected actual face image coincides with orientation of a corresponding eye area of the target sample image.

It will be realized that in the above step of obtaining an actual face image, the obtained image comprises a coordinate and a gray value of each pixel point of a face image. The image correction method of the invention is applied to correct a face image, in particular, to correct eye areas in the face image.

It should be noted that the "eye area" in the present invention refers to a visible portion (comprising pupil, iris, sclera, etc.) within the orbit, and since everyone has two eyes, there are two eye areas in the actual face image, and there are also two eye areas in the target sample image. The eye area at the left side of the actual face image corresponds to the eye area at the left side of the target sample image, and the eye area at the right side of the actual face image corresponds to the eye area at the right side of the target sample image. The "orientation of an eye area" may be understood as orientation of a pupil portion, and when image collection is performed by utilizing a camera, orientation of eye areas in the target sample image directly faces the camera. The purpose of "obtaining a target sample image matching with the actual face image" is to find a target sample image with same shooting angle and same shooting distance as the actual face image.

In the present invention, a target sample image is matched with the actual face image, that is, the respective shooting angles and shooting distances of these two face images correspond to each other, and both eye areas in the target sample image directly face the camera. Therefore, after correcting the actual face image with the image correction method of the present invention, orientation of two eye areas of the corrected face image is made to be the same as that of the two corresponding eye areas in the target sample image, that is, all directly face the camera. As to the two parties using a video system, an actual face image collected by a camera of a first party is transmitted to a second party which can use the image correction method to obtain the actual face image of the other party, correct and then display eye areas thereof, such that the corrected eye areas (specifically, pupil portions) directly face the camera of the first party, that is, for the second party, the first party is viewing toward the second party, and vice versa, which may improve visual experience of users conducting a video chat.

Correcting each eye area of the actual face image in the invention refers to obtaining a corrected actual face image in combination with information of each eye area of the actual face image and information of each eye area of the target sample image, such that a center coordinate of each pupil portion of the corrected actual face image corresponds to and is the same as a center coordinate of a corresponding pupil portion of the target sample image; coordinates of respective points on each pupil and iris area of the corrected actual face image correspond to coordinates of respective points on a corresponding pupil and iris area of the target sample image, while the gray value of each pupil and iris area of the corrected actual face image remains unchanged, such that pupil portions of the corrected actual face image directly face the camera visually.

In order to make the corrected actual face image more coherent visually, the actual face image may be obtained in real time.

In a video system utilizing the image correction method, a plurality of preset sample images may be stored, in which a sample image best-matching with the actual face image is taken as a target sample image when correcting the actual face image. As a specific embodiment of the invention, the step of obtaining a target sample image matching with the actual face image may comprise:

obtaining feature information of the actual face image; and calculating matching degree between the feature information of the actual face image and feature information of each preset sample image in a sample library, respectively, and setting, when the matching degree between a preset sample image and the actual face image is larger than a preset value, the preset sample image of which the matching degree with the actual face image is larger than the preset value as the target sample image.

Figure 2:
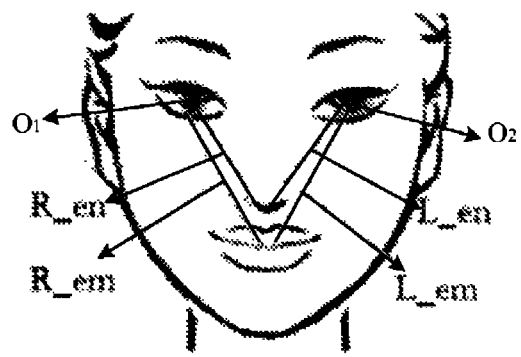
FIG. 2 is a diagram of an actual face image.
Figure 3:
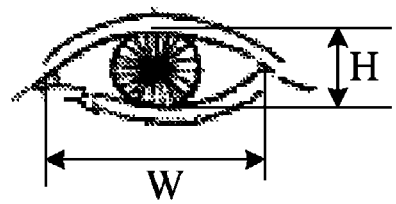
FIG. 3 is a diagram of an eye area of an actual face image.

The feature information is information which is capable of representing a position and collecting angle of a face. Specifically, as shown in FIG. 2 and FIG. 3, the feature information comprises any one or more of the following: a center coordinate of each eye area (comprising a center coordinate of a left eye area and a center coordinate of a right eye area, such as O1 and O2 in FIG. 2), an aspect ratio W/H of each eye area (shown in FIG. 3), a diameter D of an iris in each eye area, a ratio $k\_en$ of a distance $L\_en$ between a center of a left eye area and the nose to a distance $R\_en$ between a center of a right eye area and the nose, and a ratio $k\_em$ of a distance $L\_em$ between a center of a left eye area and the mouth to a distance $R\_em$ between a center of a right eye area and the mouth. Preferably, when obtaining feature information of the actual face image, the above types of specific feature information are obtained simultaneously to determine an accurate position and collecting angle of the face.

The center coordinates of the eye areas are used to determine positions of the eye areas of the face in an image collected by the camera. The coordinate system used to determine the center coordinate of each eye area of the actual face image should correspond to the coordinate system used to determine the center coordinate of each eye area of the target sample image. When the center coordinate of each eye area of the actual face image coincides with the center coordinate of a corresponding eye area of the target sample image, the relative position of each eye area of the actual face image on the face coincides with the relative position of the corresponding eye area of the target sample image on the face. It should be appreciated that the center of an eye area herein is the center of an ellipse like shape formed by orbit, rather than the center of an iris or pupil.

When the above feature information has been determined, posture of the face being shot and position of the camera with respect to eye areas can be determined. For example, when it is detected that the distance L_en between the center of the left eye area and the nose is equal to the distance R_en between the center of the right eye area and the nose, the distance L_em between the center of the left eye area and the mouth is equal to the distance R_em between the center of the right eye area and the mouth, and coordinates of the center of the left eye area and the center of the right eye area are both standard coordinate values, then the camera is located in front of the center of a connecting line between the two eye areas; when it is detected that the ratio k_en of the distance L_en between the center of the left eye area and the nose to the distance R_en between the center of the right eye area and the nose and the ratio k_em of the distance L_em between the center of the left eye area and the mouth to the distance R_em between the center of the right eye area and the mouth are both larger than 1, and the abscissa of the center of the left eye area and the abscissa of the center of the right eye area are larger than the standard abscissa, and the ordinate of the center of the left eye area and the ordinate of the center of the right eye area are both the standard ordinate, then the camera is shooting from a position at the left-front side of the face; when it is detected that the ratio k_en of the distance L_en between the center of the left eye area and the nose to the distance R_en between the center of the right eye area and the nose and the ratio k_em to the distance R_em between the center of the right eye area and the mouth are both larger than 1, the ratio k_em of to the distance R_em between the center of the right eye area and the mouth is larger than the ratio k_en of the distance L_en between the center of the left eye area and the nose to the distance R_en between the center of the right eye area and the nose, the abscissa of the center of the left eye area and the abscissa of the center of the right eye area are both larger than the standard abscissa, and the ordinate of the center of the left eye area and the ordinate of the center of the right eye area are both larger than the standard ordinate, then the camera is shooting from a lower-left position in front of the face.

When calculating matching degree between the feature information of the actual face image and the feature information of the preset sample image, the matching degree can be calculated for each specific type of feature information of two images respectively, and when the matching degree for each specific type of feature information is larger than a threshold, it indicates that the preset sample image is a target sample image matching with the actual face image. That is, the following information between the actual face image and a sample image is compared one by one: a center coordinate of each eye area, an aspect ratio W/H of each eye area, a diameter D of an iris in each eye area, a ratio k_en of a distance L_en between a center of a left eye area and the nose to a distance R_en between center of a right eye area and the nose, and a ratio k_em of a distance L_em between a center of a left eye area and the mouth to a distance R_em between a center of a right eye area and the mouth.

An edge detection method may be employed in the present invention to detect a portion of edge points of the orbit, and according to the feature that human eye is in ellipse shape, an ellipse corresponding to each eye area is calculated with though transformation, thereby calculating the center coordinate of each eye area.

The image correction method of the present invention is used to correct each eye area of the actual face image, such that orientation of each eye area of the corrected actual face image is the same as that of a corresponding eye area of the target sample image. For some actual face images, orientation of each eye area thereof coincides with that of each eye area of the target sample image, therefore, it may be unnecessary to correct these actual face images. Specifically, between the step of obtaining a target sample image matching with the actual face image and the step of correcting each eye area of the actual face image according to the target sample image such that orientation of each eye area of the corrected actual face image coincides with orientation of a corresponding eye area of the target sample image, the method further comprises:

obtaining a center coordinate of a pupil portion of each eye area in the actual face image and a center coordinate of a pupil portion of the corresponding eye area in the target sample image; and calculating a distance between the center coordinate of the pupil portion of each eye area in the actual face image and the center coordinate of the pupil portion of the corresponding eye area in the target sample, and performing, when the distance is large than a predefined value, the step of correcting each eye area of the actual face image according to the target sample image such that orientation of each eye area of the corrected actual face image coincides with orientation of the corresponding eye area of the target sample image.

It is easy to be understood that distance between two eyes of a person is fixed, and if a distance between a center coordinate of a pupil portion of one eye area in an actual face image and a center coordinate of a pupil portion of a corresponding eye area in a target image is larger than the predefined value, then a distance between a center coordinate of a pupil portion of the other eye area in the actual face image and a center coordinate of a pupil portion of a corresponding eye area is also larger than the predefined value.

When the distance between the center coordinate of the pupil portion of each eye area in the actual face image and the center coordinate of the pupil portion of the corresponding eye area in the target sample is less than a predefined value, the position of the pupil portion in the eye area in the actual face image coincides with that of the pupil portion in the eye area in the target sample image, at this point, it may be decided that orientation of the eye area in the actual face image coincides with that of the corresponding eye area in the target sample image, and thus there is no need to perform correction on the actual face image. Here, the predefined value may be chosen between 0~0.5 mm, of course, the predefined value may be chosen based on size of the actual face image, and there is no limitation herein.

Further, the image correction method further comprises the following steps performed before the step of obtaining an actual face image:

collecting a plurality of face images as preset sample images, orientation of eye areas of the human being collected in each preset sample image directly facing a camera; and obtaining and storing feature information of each preset sample image to form the sample library.

The plurality of face images may be images obtained by performing collection on different faces, and the camera may perform image collection on faces at different distances and different angles. In the described correction method, after comparing feature information of the actual face image to feature information of the preset sample images, a preset sample image matching with the actual face image is selected as a target sample image, where both of position and angle of the corresponding face in the target sample image coincide with position and angle of the corresponding face in the actual face image, that is, matching degree between the feature information of the target sample image and the feature information of the actual face image is larger than a preset value.

It will be appreciated by those skilled in the art that the image is stored in form of gray value and the feature information is stored in form of numerical value, and in order to save storage space, normalization processing may be performed on the gray value and feature information of the image.

For quickly finding a target sample image matching with the actual face image from a plurality of preset sample images, preferably, the image correction method further comprises the following step performed after the step of obtaining and storing each preset sample image:

classifying the plurality of preset sample images into a plurality of classes according to a predefined rule; and after classifying the plurality of preset sample images into a plurality of classes, the step of calculating matching degree between the feature information of the actual face image and feature information of each preset sample image in a sample library respectively may comprise:

determining a class of preset sample images corresponding to the actual face image; and calculating matching degree between feature information of the actual face image and feature information of each preset sample image within the class of preset sample images corresponding to the actual face image.

As stated above, the feature information may comprise multiple pieces of different information: a center coordinate of each eye area, an aspect ratio of each eye area, a diameter of an iris in each eye area, a ratio of a distance between a center of a left eye area and the nose to a distance between a center of a right eye area and the nose, and a ratio of a distance between a center of a left eye area and the mouth to a distance between a center of a right eye area and the mouth. Accordingly, when performing classification, all sample images may first be classified into a main classes according to the center coordinate of each eye area, where ranges of the center coordinates of respective eye areas in each of the a main classes are different; then the a main classes are classified again according to the aspect ratio of each eye area to obtain b subclasses, where ranges of the center coordinates of eye areas in each of the b subclasses are different to each other, and ranges of the aspect ratio of eye areas are also different to each other; then the b classes are again classified according to the height of eyes to obtain c classes, and so one. Finally, m classes of preset sample images are obtained, and ranges of at least one piece of specific feature information of any two classes of preset sample images are different, for example, at least ranges of the aspect ratio of eye areas being different, or at least ranges of the center coordinates of eye areas being different.

It is noted that in the m classes of preset sample images, each class may comprise a plurality of sample images therein, and when respective specific feature information of the actual face image is within the range of respective specific feature information of the $n^{th}$ class of preset images, and in the $n^{th}$ class there are multiple preset sample images for which the matching degrees with the actual face image are larger than a preset value, the preset sample image having the highest matching degree is taken as the target sample image.

Specifically, the above predefined rule may comprise a maximum likelihood classification method. For example, when the preset sample images of which the aspect ratio of eye areas is between 1.5~2 and the diameter of iris is between 1.0~1.2 are classified into a first main class, if there is no qualified preset sample image in the sample library, the maximum likelihood classification method may classify those preset sample images of which the aspect ratio of eye areas is between 1.45~2 and the diameter of iris is between 1.0~1.2 into that class.

It is appreciated that when an angle α by which the iris and pupil portion in the actual face image deviates from the camera is relatively large (such as turning the face aside slightly), in adjusting orientation of the pupil portion of eye areas, the iris and pupil portion needs to be deflected by a relatively large angle α to achieve the purpose that the pupil is directly facing the camera. In real life, however, human's visual perception has certain range, namely, although the iris and pupil portion can turn a certain angle, when the angle by which the iris and pupil portion turns is too large, only a small portion of the iris and pupil portion can appear in the eye area. During correction, to prevent from turning the iris and pupil portion by an angle which is too large, the image correction method further comprises the following steps performed before the step of obtaining an actual face image:

establishing a coordinate axis within a visual field range of the camera;

setting a predefined coordinate range within the visual field range, the predefined coordinate range being greater than the distance between center coordinates of two eye areas of the target sample image; and setting, when a center coordinate value of any one of eye areas of the actual face image exceeds the predefined coordinate range, a boundary value of the predefined coordinate range as an actual coordinate value of the center of the eye area in the actual face image which exceeds the predefined coordinate range.

The predefined coordinate range may be determined according to the visual field range of the camera and a distance of the face to the camera, and it is appreciated that the predefined coordinate range is smaller than a range which can be shot by the camera. For example, given an image shot by the camera is an image of 30 cm*20 cm, the predefined coordinate range may be set as 20 cm*10 cm, that is, taking a center of the whole image as the origin of coordinate, when the abscissa of a center of human eye (such as a center coordinate of a left eye area) is smaller than −10 cm, such as −11 cm, the actual abscissa of the center of the human eye is set as −10 cm, such that in correction, the movement amount of a center of a left eye area and a center of a right eye area will be decreased by 1 cm, thereby reducing difficulty in correction. Similarly, when the abscissa of a center of human eye is larger than 10 cm, the actual abscissa of the center of human eye is set as 10 cm.

In the present invention, the step of correcting each eye area of the actual face image according to the target sample image such that orientation of each eye area of the corrected actual face image coincides with orientation of a corresponding eye area of the target sample image may comprise:

obtaining information of feature points of each eye area in the actual face image and information of target feature points, in the corresponding target sample image, corresponding to the feature points of each eye area in the actual face image;

calculating mapping relationship between the feature points of each eye area in the actual face image and the corresponding target feature points; and calculating a corrected position of each feature point of each eye area in the actual face image according to the mapping relationship.

Figure 4:
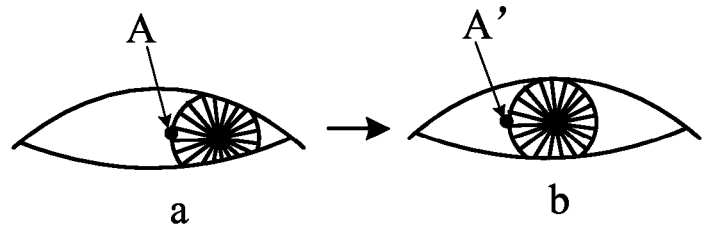
FIG. 4 is a diagram of an eye area of an actual face image and an eye area of a target sample image.

The feature points of an eye area in the actual face image may be a portion of edge points of an iris in the eye area, and target feature points in the target sample image corresponding to the feature points of the eye area in the actual face image are a portion of edge points of an iris in the target sample image. According to the circular feature of an iris of human eye, positions of the feature points in the actual face image on the iris is the same as positions of the target feature points in the target sample image on the iris, and information of the feature points in the actual face image and the target feature points in the target sample image may both comprise coordinate information and gray value. Since pupils in the target sample image directly face the camera, while pupils in the actual face image do not necessarily directly face the camera, coordinate information and gray value of the feature points in the actual face image and the target feature points in the target sample image may all be different to each other. As shown in FIG. 4, a is an eye area of an actual face image to be corrected, where a feature point A is located at the left of an iris, b in FIG. 4 is an eye area in a target sample image, where a target feature point A' is also located at the left of an iris, then the feature point A corresponds to the target feature point A', but the coordinates and the gray values of A and A' are not the same.

A plurality of feature points may be selected in an eye area of the actual face image, mapping relationship between the feature points and the corresponding target feature points may be calculated according to actual coordinate values and gray values of the feature points and the corresponding target feature points, so that a coordinate position of a target point, in the target sample image, corresponding to each pixel point of eye areas in the actual face image to be corrected is calculated by utilizing this mapping relationship. The mapping relationship may be, for example, if the position of a target feature point in the target sample image is 2 mm to the right of the position of a feature point in the actual face image to be corrected, then when correcting the image according to this mapping relationship, the gray value of pixel point for this point may be modified as the gray value of a pixel point at 2 mm to the left of this pixel point, and the gray value of this pixel point is moved to the right by 2 mm, such that the visual effect is that the iris and pupil portion is moved to the right by 2 mm, thus the position of the pupil portion of the corrected face image coincides with that of the pupil portion of the target sample image, making orientation of the pupil portion of the corrected face image coincides with that of the pupil portion of the target sample image, that is, both of which are directly facing the camera.

As another aspect of the invention, there is provided an image correction apparatus, comprising:

an actual image obtaining module 10 for obtaining an actual face image;

a target sample image obtaining module 20 for obtaining a target sample image matching with the actual face image; and a processing module 40 for correcting each eye area of the actual face image according to the target sample image such that orientation of each eye area of the corrected actual face image coincides with orientation of a corresponding eye area of the target sample image.

A plurality of preset sample images may be stored in the image correction apparatus in advance, and the target sample image obtaining module 20 can compare the plurality of preset sample images with the actual face image, thereby selecting a target sample image matching with the actual face image. Whether a preset sample image matches with the actual face image may be decided by comparing feature information of both images. Specifically, the target sample image obtaining module 20 comprises:

a feature information obtaining unit 21 for obtaining feature information of the actual face image; and a matching degree calculating unit 22 for calculating matching degree between the feature information of the actual face image and feature information of each preset sample image in a sample library, respectively, and for setting, when the matching degree between a preset sample image and the actual face image is larger than a preset value, the preset sample image of which the matching degree with the actual face image is larger than the preset value as the target sample image.

As stated above, the feature information comprises any one or more of the following: a center coordinate of each eye area (O1 and O2 in FIG. 2), an aspect ratio W/H of an eye area, a diameter D of an iris in each eye area, a ratio k_en of a distance L_en between a center of a left eye area and the nose to a distance R_en between a center of a right eye area and the nose, a ratio k_em of a distance L_em between a center of a left eye area and the mouth to a distance R_em between a center of a right eye area and the mouth.

In order for deciding whether the actual face image needs to be corrected, the image correction apparatus further comprises:

a coordinate obtaining module 90 for obtaining a center coordinate of a pupil portion of each eye area in the actual face image and a center coordinate of a pupil portion of each eye area in the target sample image; and a decision module 30 for calculating a distance between a center coordinate of a pupil portion of an eye area in the actual face image and a center coordinate of a pupil portion of a corresponding eye area in the target sample image; when the distance is large than a predefined value, the processing module 40 may correct each eye area of the actual face image according to the target sample image such that orientation of each eye area of the corrected actual face image coincides with orientation of the corresponding eye area of the target sample image. When the decision module 30 decides that the distance between the center coordinate of the pupil portion of each eye area in the actual face image and the center coordinate of the pupil portion of the corresponding eye area in the target sample is smaller than the predefined value, there is no need to correct the actual face image.

Further, the feature information obtaining unit 21 also may obtain feature information of preset sample images, and the image correction apparatus further comprises:

a sample image collecting module 50 for collecting a plurality of face images as preset sample images, orientation of each eye area of the human being collected in each preset sample image directly facing the sample image collecting module 50; and a storing module 60 for storing feature information of each preset sample image to form the sample library.

Here, the process of collecting preset sample images with the sample image collecting module 50 may be performed before obtaining an actual face image. A plurality of preset sample images has already been stored in the storing module 60 before obtaining an actual face image by the actual image obtaining module 10.

To quickly find a target sample image matching with the actual face image from a plurality of preset sample images, the image correction apparatus may further comprise:

a classifying module 70 for classifying the plurality of preset sample images into a plurality of classes according to a predefined rule; and the target sample image obtaining module 20 further comprises: a categorizing unit 23 for determining a class of preset sample images corresponding to the actual face image; and when the categorizing unit 23 determines that the actual face image corresponds to the $n^{th}$ class of preset sample images (that is, feature information of the actual face image corresponds to the range of feature information of the $n^{th}$ class of preset sample images), the matching degree calculating unit 22 is capable of calculating matching degree between feature information of the actual face image and feature information of each preset sample image within the class of preset sample images corresponding to the actual face image, respectively.

Specifically, as stated above, the predefined rule comprises the maximum likelihood classification method.

Figure 5:
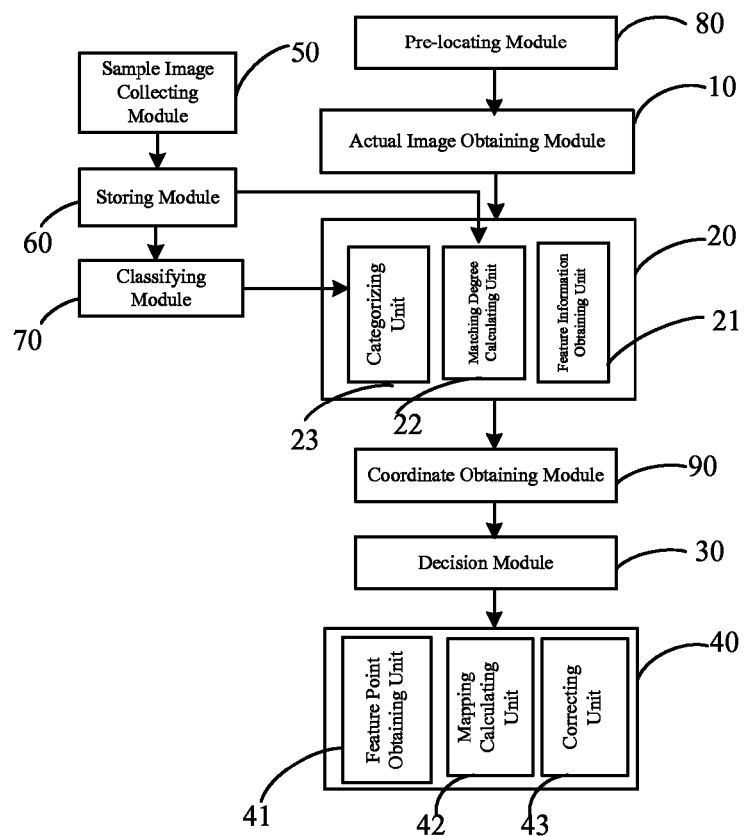
FIG. 5 is a structural diagram of an image correction apparatus in an embodiment of the invention.

As shown in FIG. 5, the image correction apparatus may further comprise:

a pre-locating module 80 for establishing a coordinate axis within a visual field range of the camera and setting a predefined coordinate range within the visual field range, the predefined coordinate range being greater than the distance between center coordinates of two eye areas of the target sample image; and setting, when a center coordinate value of any one of eye areas of the actual face image exceeds the predefined coordinate range, a boundary value of the predefined coordinate range as an actual coordinate value of the center of the eye area in the actual face image which exceeds the predefined coordinate range.

In a video system comprising the image correction apparatus, a camera of a first party may collect a whole image comprising an actual face image and a background image, and the actual image obtaining module in the image correction apparatus of a second party may receive the whole image collected by the camera of the first party. The predefined coordinate range is set on the whole image.

The pre-locating module 80 can determine the actual coordinate of each eye area according to the predefined coordinate range, and the processing module 40 can fetch the actual coordinate values of the center of each eye area directly from the pre-locating module 80, when adjusting orientation of the pupil of each eye area in the face image.

Specifically, the processing module 40 may comprise:

a feature point obtaining unit 41 for obtaining information of feature points of each eye area in the actual face image and target feature points in the corresponding target sample image which match with the feature points of each eye area in the actual face image;

a mapping calculating unit 42 for calculating mapping relationship between the feature points of each eye area in the actual face image and the corresponding target feature points; and a correcting unit 43 for calculating a corrected position of each feature point of each eye area in the actual face image according to the mapping relationship.

As still another aspect of the invention, there is provided a video system comprising the above mentioned image correction apparatus. For example, for two parties using the video system, a camera of the first party collects each frame of the actual face image of the first party and transmits it to the image correction apparatus of the second party by utilizing a network, and the actual image obtaining module in the image correction apparatus of the second party can obtain the actual face image collected by the camera of the first party, and perform decision and correction on the actual face image, such that orientations of respective eye areas of the corrected face image both directly face the camera, thus for the second party, eyes of the other party are looking at himself/herself all the time during the communication therewith, achieving the effect of an equal communication and improving sensory experience.

The foregoing is description of an image correction method, an image correction apparatus and a video system provided by the present invention, where a plurality of preset sample images may be stored in the image correction apparatus in advance, and orientations of respective eye areas of the preset sample images all directly face the camera, therefore, when correcting a face image by using the above image correction method, a target sample image matching with the actual face image may be obtained, and it may be decided whether orientations of eye areas of the actual face image coincide with orientations of eye areas of the target sample image. When orientation of each eye area of the actual face image does not coincide with that of a corresponding eye area of the target sample image, each eye area of the actual face image is corrected to make orientations of eye areas of the corrected actual face image coincide with orientations of corresponding eye areas of the target sample image, thereby achieving the effect of directly facing the camera, so that when a user is performing a communication by using the video system, an image of the other party seen by the user is looking at himself/herself, thus improving sensory experience.

It is appreciated that the above embodiments are merely illustrative embodiments employed for illustrating principle of the invention, and the invention is not limited thereto. Various variations and improvements may be made by those skilled in the art without departing from the spirit and essence of the invention, and such variations and improvements are also considered as the protection scope of the invention.

The invention claimed is:

1. An image correction method, comprising:
    obtaining an actual face image;
    obtaining a target sample image matching the actual face image, the target sample image obtained from a plurality of preset sample images based at least in part on a matching degree between each of the preset sample images and the actual face image; and
    correcting each eye area of the actual face image according to the target sample image such that orientation of each eye area of the corrected actual face image coincides with orientation of a corresponding eye area of the target sample image.

2. The image correction method according to claim 1, wherein each of the plurality of sample images are in a sample library, and the step of obtaining a target sample image matching the actual face image comprises:
    obtaining feature information of the actual face image; and
    calculating a matching degree between the feature information of the actual face image and feature information of each of the preset sample images in sample library respectively; and
    setting, when the matching degree between one of the preset sample images and the actual face image is larger than a preset value, the preset sample image having the matching degree with the actual face image larger than the preset value as the target sample image.

3. The image correction method according to claim 2, wherein the feature information comprises any one or more of the following: a center coordinate of each eye area, an aspect ratio of each eye area, a diameter of an iris in each eye area, a ratio of a distance between a center of a left eye area and the nose to a distance between a center of a right eye area and the nose, and a ratio of a distance between a center of a left eye area and the mouth to a distance between a center of a right eye area and the mouth.

4. The image correction method according to claim 2, further comprising, between obtaining a target sample image matching with the actual face image and correcting each eye area of the actual face image according to the target sample image such that orientation of each eye area of the corrected actual face image coincides with orientation of a corresponding eye area of the target sample image:
    obtaining a center coordinate of a pupil portion of each eye area in the actual face image and a center coordinate of a pupil portion of each eye area in the target sample image;
    calculating a distance between the center coordinate of the pupil portion of each eye area in the actual face image and the center coordinate of the pupil portion of the corresponding eye area in the target sample image, and performing, when the distance is large than a predefined value, correcting each eye area of the actual face image according to the target sample image such that orientation of each eye area of the corrected actual face image coincides with orientation of the corresponding eye area of the target sample image.

5. The image correction method according to claim 2, wherein the image correction method further comprises the following performed before obtaining the actual face image:
    collecting a plurality of face images as the preset sample images, orientation of each eye area of a human being collected in each preset sample image directly facing a camera; and
    obtaining and storing feature information of each preset sample image to form the sample library.

6. The image correction method according to claim 5, wherein the image correction method further comprises the following performed after obtaining and storing feature information of each preset sample image:
    classifying the preset sample images into a plurality of classes according to a predefined rule; and
    calculating matching degree between the feature information of the actual face image and feature information of each preset sample image in the sample library respectively comprises:
    determining a class of preset sample images corresponding to the actual face image; and
    calculating the matching degree between the feature information of the actual face image and the feature information of each preset sample image within the class of preset sample images corresponding to the actual face image.

7. The image correction method according to claim 6, wherein the predefined rule comprises a maximum likelihood classification method.

8. The image correction method according to claim 1, wherein the image correction method further comprises the following performed before obtaining an actual face image:
    establishing a coordinate axis within a visual field range of the camera;
    setting a predefined coordinate range within the visual field range, the predefined coordinate range being greater than a distance between center coordinates of two eye areas of the target sample image; and
    setting, when a center coordinate value of any one of eye areas of the actual face image exceeds the predefined coordinate range, a boundary value of the predefined coordinate range as an actual coordinate value of the center of the eye area in the actual face image which exceeds the predefined coordinate range.

9. The image correction method according to claim 1, wherein correcting each eye area of the actual face image according to the target sample image such that orientation of each eye area of the corrected actual face image coincides with orientation of a corresponding eye area of the target sample image comprises:
    obtaining information of feature points of each eye area in the actual face image and information of target feature points, in the corresponding target sample image, corresponding to the feature points of each eye area in the actual face image;
    calculating a mapping relationship between the feature points of each eye area in the actual face image and the corresponding target feature points; and
    calculating a corrected position of each feature point of each eye area in the actual face image according to the mapping relationship.

10. An image correction apparatus, comprising:
    an actual image obtaining module for obtaining an actual face image;
    a target sample image obtaining module for obtaining a target sample image matching the actual face image, the target sample image obtained from a plurality of preset sample images based at least in part on a matching degree between each of the preset sample images and the actual face image; and
    a processing module for correcting each eye area of the actual face image according to the target sample image such that orientation of each eye area of the corrected actual face image coincides with orientation of a corresponding eye area of the target sample image.

11. The image correction apparatus according to claim 10, wherein each of the plurality of sample images are in a sample library, and the target sample image obtaining module comprises:
    a feature information obtaining unit for obtaining feature information of the actual face image; and
    a matching degree calculating unit for calculating a matching degree between the feature information of the actual face image and feature information of each of the preset sample images in the sample library respectively; and
    setting, when the matching degree between one of the preset sample images and the actual face image is larger than a preset value, the preset sample image having the matching degree with the actual face image larger than the preset value as the target sample image.

12. The image correction apparatus according to claim 11, wherein the feature information comprises any one or more of the following: a center coordinate of each eye area, an aspect ratio of each eye area, a diameter of an iris in each eye area, a ratio of a distance between a center of a left eye area and the nose to a distance between a center of a right eye area and the nose, and a ratio of a distance between a center of a left eye area and the mouth to a distance between a center of a right eye area and the mouth.

13. The image correction apparatus according to claim 11, wherein the feature information obtaining unit is further configured to obtain feature information of preset sample images, and
    the image correction apparatus further comprises:

a sample image collecting module for collecting a plurality of face images as the preset sample images, orientation of each eye area of a human being collected in each preset sample image directly facing the sample image collecting module; and a storing module for storing feature information of each preset sample image to form the sample library.

14. The image correction apparatus according to claim 13, wherein the image correction apparatus further comprises:

a classifying module for classifying the preset sample images into a plurality of classes according to a predefined rule; and the target sample image obtaining module further comprises:

a categorizing unit for determining a class of preset sample images corresponding to the actual face image; and the matching degree calculating unit configured to calculate the matching degree between the feature information of the actual face image and the feature information of each preset sample image within the class of preset sample images corresponding to the actual face image, respectively.

15. The image correction apparatus according to claim 14, wherein the predefined rule comprises a maximum likelihood classification method.

16. The image correction apparatus according to claim 10, wherein the image correction apparatus further comprises:

a coordinate obtaining module for obtaining a center coordinate of a pupil portion of each eye area in the actual face image and a center coordinate of a pupil portion of each eye area in the target sample image; and a decision module for calculating a distance between the center coordinate of the pupil portion of each eye area in the actual face image and the center coordinate of the pupil portion of the corresponding eye area in the target sample image; when the distance is large than a predefined value, the processing module configured to correct eye areas of the actual face image according to the target sample image such that orientation of each eye area of the corrected actual face image coincides with orientation of the corresponding eye area of the target sample image.

17. The image correction apparatus according to claim 10, wherein the image correction apparatus further comprises:

a pre-locating module for establishing a coordinate axis within a visual field range of a camera and setting a predefined coordinate range within the visual field range, the predefined coordinate range being greater than a distance between center coordinates of two eye areas of the target sample image; and setting, when a center coordinate value of any one of eye areas of the actual face image exceeds the predefined coordinate range, a boundary value of the predefined coordinate range as an actual coordinate value of the center of the eye area in the actual face image which exceeds the predefined coordinate range.

18. The image correction apparatus according to claim 10, wherein the processing module comprises:

a feature point obtaining unit for obtaining information of feature points of each eye area in the actual face image and target feature points in the corresponding target sample image which match with the feature points of each eye area in the actual face image;

a mapping calculating unit for calculating mapping relationship between the feature points of each eye area in the actual face image and the corresponding target feature points; and a correcting unit for calculating a corrected position of each feature point of each eye area in the actual face image according to the mapping relationship.

19. A video system comprising a camera for collecting the actual face image, and the image correction apparatus according to claim 10.

* * * * *